US012798377B2

(12) United States Patent
Naserian et al.

(10) Patent No.: US 12,798,377 B2
(45) Date of Patent: Nov. 17, 2026

(54) VIRTUAL AUGMENTATION OF ROADWAYS BASED ON PERCEPTION AND SAFETY POLICIES

(71) Applicant: GM GLOBAL TECHNOLOGY OPERATIONS LLC, Detroit, MI (US)

(72) Inventors: Mohammad Naserian, Windsor (CA); Donald K. Grimm, Utica, MI (US); Omer Tsimhoni, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 10 days.

(21) Appl. No.: 19/023,806

(22) Filed: Jan. 16, 2025

(65) Prior Publication Data

US 2026/0200320 A1 Jul. 16, 2026

(51) Int. Cl.
*B60K 35/28* (2024.01)
*B60K 35/233* (2024.01)

(52) U.S. Cl.
CPC ............ *B60K 35/28* (2024.01); *B60K 35/233* (2024.01); *B60K 2360/177* (2024.01); *B60K 2360/1868* (2024.01); *B60K 2360/188* (2024.01); *B60K 2360/31* (2024.01); *B60K 2360/349* (2024.01)

(58) Field of Classification Search
None
See application file for complete search history.

(56) References Cited

U.S. PATENT DOCUMENTS

| | | | | |
|---|---|---|---|---|
| 6,272,431 | B1 * | 8/2001 | Zamojdo | G01C 21/36 701/454 |
| 9,625,264 | B1 * | 4/2017 | Imanishi | G01C 21/3602 |
| 10,595,176 | B1 * | 3/2020 | Gallagher | B60R 1/24 |
| 10,663,315 | B2 * | 5/2020 | Iguchi | G01C 21/365 |
| 10,981,507 | B1 * | 4/2021 | Benjamin | B60K 35/00 |
| 10,996,070 | B2 * | 5/2021 | Yang | G06V 20/582 |

(Continued)

FOREIGN PATENT DOCUMENTS

| | | | |
|---|---|---|---|
| DE | 102011006347 | A1 | 10/2012 |
| DE | 102013016242 | A1 | 4/2015 |
| DE | 102017216775 | A1 | 3/2019 |

OTHER PUBLICATIONS

German Office Action from counterpart DE1020251096260, dated Aug. 5, 2025.
U.S. Appl. No. 18/796,989, filed Aug. 7, 2024, Fahim Ahmed.

*Primary Examiner* — Jonathan M Dager

(57) ABSTRACT

A virtual augmentation system includes: one or more head-up displays displaying virtual images over an environment forward of a host vehicle; sensors determining parameters indicative of a state of the host vehicle; a telematics module obtaining roadway information indicative of roadway markings and objects along a predicted path of the host vehicle; and a virtual marker and object modification module, based on the parameters and the roadway information, i) detecting one or more roadway markings and objects, ii) generating modified versions of the one or more detected roadway markings and objects as one or more virtual roadway markings and objects, and iii) via the one or more head-up displays, overlaying the virtual one or more roadway markings and objects over at least a portion of the one or more detected roadway markings and objects in a field of view of an occupant of the host vehicle.

18 Claims, 8 Drawing Sheets

(56) References Cited

U.S. PATENT DOCUMENTS

| | | | | |
|---|---|---|---|---|
| 11,378,413 | B1 * | 7/2022 | Rao | G01C 21/3438 |
| 11,615,724 | B2 * | 3/2023 | Kunze | B60K 35/81 345/7 |
| 11,761,783 | B2 * | 9/2023 | Doemling | B60R 1/24 701/439 |
| 11,953,697 | B1 * | 4/2024 | Wan | B60K 35/00 |
| 12,118,883 | B2 * | 10/2024 | Grace | G01C 21/30 |
| 12,361,725 | B2 * | 7/2025 | Sharma | G06V 10/82 |
| 12,437,642 | B1 * | 10/2025 | Szczerba | B62D 15/027 |
| 2009/0005961 | A1 * | 1/2009 | Grabowski | G02B 27/01 701/532 |
| 2010/0292886 | A1 * | 11/2010 | Szczerba | G01S 13/723 701/31.4 |
| 2011/0052042 | A1 * | 3/2011 | Ben Tzvi | G06V 20/56 382/154 |
| 2011/0301813 | A1 * | 12/2011 | Sun | B62D 15/029 348/148 |
| 2016/0041386 | A1 * | 2/2016 | Rodriguez Moreno | B60K 35/10 345/7 |
| 2016/0084661 | A1 * | 3/2016 | Gautama | G01C 21/365 701/400 |
| 2016/0313562 | A1 * | 10/2016 | Saisho | B60K 35/235 |
| 2016/0339959 | A1 * | 11/2016 | Lee | B62D 15/0265 |
| 2017/0154554 | A1 * | 6/2017 | Tanaka | B60K 35/10 |
| 2017/0350720 | A1 * | 12/2017 | Turner | G06F 16/29 |
| 2018/0031384 | A1 * | 2/2018 | Lee | G01C 21/3602 |
| 2018/0031849 | A1 * | 2/2018 | Omanovic | B60K 35/233 |
| 2018/0058873 | A1 * | 3/2018 | Huang | B60Q 1/346 |
| 2018/0247138 | A1 * | 8/2018 | Kang | G06V 10/762 |
| 2018/0370567 | A1 * | 12/2018 | Rowell | B60K 35/21 |
| 2019/0049724 | A1 * | 2/2019 | Kimura | B60K 35/232 |
| 2020/0012097 | A1 * | 1/2020 | Kubota | B60K 35/23 |
| 2020/0058139 | A1 * | 2/2020 | Turner | B60K 35/23 |
| 2020/0189390 | A1 * | 6/2020 | Viswanathan | B60K 35/10 |
| 2020/0406754 | A1 * | 12/2020 | Kassner | B60K 35/10 |
| 2021/0341737 | A1 * | 11/2021 | Horihata | B60K 35/10 |
| 2022/0144087 | A1 * | 5/2022 | Takemori | B60K 35/10 |
| 2022/0172652 | A1 * | 6/2022 | Yagyu | B60K 35/10 |
| 2023/0368123 | A1 * | 11/2023 | Haque | G06Q 10/047 |
| 2024/0198800 | A1 * | 6/2024 | Tsuda | B60K 35/00 |
| 2024/0308335 | A1 * | 9/2024 | Dos Reis Costa | B60K 35/00 |
| 2024/0317252 | A1 * | 9/2024 | Chilton | B60K 35/00 |
| 2025/0171038 | A1 * | 5/2025 | Ishida | B60W 60/0015 |
| 2025/0216213 | A1 * | 7/2025 | Dobkowitz | G01C 21/3632 |
| 2026/0184172 | A1 * | 7/2026 | Zavesky | B60K 35/285 |

* cited by examiner

VIRTUAL AUGMENTATION OF ROADWAYS BASED ON PERCEPTION AND SAFETY POLICIES

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to head-up displays (HUDs) and vehicle augmented reality systems.

A HUD can be used within a vehicle to project various information including vehicle parameters and status information, environment information, navigation information, infotainment information, etc. A HUD can include an image generator, projection devices (e.g., optics, mirrors, etc.) and a combiner. As an example, the combiner may be implemented as a windshield of a vehicle. The image generator outputs a light beam to projection devices, which then reflect the light beam to the combiner. The light beam includes an image that is sized, flipped, positioned and/or reflected by the windshield. The windshield serves as a reflector by which the image is visible to a driver of the vehicle as a virtual image, which is perceived by the driver as being shown within an environment forward of the vehicle.

SUMMARY

A virtual augmentation system is disclosed and includes: one or more head-up displays configured to display virtual images over an environment forward of a host vehicle; sensors configured to determine parameters indicative of a state of the host vehicle; a telematics module configured to obtain roadway information indicative of roadway markings and objects along a predicted path of the host vehicle; and a virtual marker and object modification module configured based on the parameters and the roadway information, i) to detect one or more roadway markings and objects, ii) to generate modified versions of the one or more detected roadway markings and objects as one or more virtual roadway markings and objects, and iii) via the one or more head-up displays, to overlay the virtual one or more roadway markings and objects over at least a portion of the one or more detected roadway markings and objects in a field of view of an occupant of the host vehicle.

In other features, the virtual marker and object modification module is configured to widen one or more lane lines and, via the one or more head-up displays, to display the widened lane lines over detected and existing lane lines in the field of view.

In other features, the virtual marker and object modification module is configured to modify one or more lane lines including changing at least one of color, brightness, contrast ratio, and luminance of the one or more lane lines and, via the one or more head-up displays, to display the modified one or more lane lines over detected and existing lane lines in the field of view.

In other features, the virtual marker and object modification module is configured to change one or more portions of the one or more detected roadway markings and objects and, via the one or more head-up displays, to display the changed one or more portions over the one or more detected roadway markings and objects in the field of view.

In other features, the virtual marker and object modification module is configured to change one or more portions of one or more roadway markings and, via the one or more head-up displays, to display the changed one or more portions over detected and existing roadway markings in the field of view.

In other features, the virtual marker and object modification module is configured to generate a modified version of a detected roadway sign and, via the one or more head-up displays, to display the modified version of the roadway sign over the detected roadway sign in the field of view.

In other features, the virtual marker and object modification module is configured to render a virtual guardrail in the field of view.

In other features, the virtual marker and object modification module is configured to change a detected guardrail to provide a virtual guardrail, and via the one or more head-up displays, display in the field of view the virtual guardrail closer to a lane of travel of the host vehicle than the detected guardrail.

In other features, the virtual marker and object modification module is configured to: via the one or more head-up displays, display chevrons in the field of view; determine at least one of a radius of curvature of an upcoming portion of a road on which the host vehicle is traveling and a speed of the host vehicle; and based on the at least one of the radius and the speed, adjust spacing between the chevrons.

In other features, the virtual marker and object modification module is configured i) to detect an existing center lane line and an existing edge lane line, ii) to generate modified versions of the center lane line and the edge lane line as a virtual center lane line and a virtual edge lane line, and iii) to display the virtual center lane line and the virtual edge lane line over respectively the existing center lane line and existing edge lane line in the field of view.

In other features, the virtual marker and object modification module is configured i) to detect speed of the host vehicle, ii) based on the speed, to determine at least one of widths of virtual lane lines and a distance between the virtual lane lines, and iii) via the one or more head-up displays, to display the virtual lane lines over existing lane lines in the field of view.

In other features, a virtual augmentation method is provided and includes: determining parameters indicative of a state of a host vehicle; obtaining roadway information indicative of roadway markings and objects along a predicted path of the host vehicle; and based on the parameters and the roadway information, detecting one or more roadway markings and objects, generating modified versions of the one or more detected roadway markings and objects as one or more virtual roadway markings and objects, and via one or more head-up displays, overlaying the virtual one or more roadway markings and objects over at least a portion of the one or more detected roadway markings and objects in a field of view of an occupant of the host vehicle.

In other features, the virtual augmentation method further includes: collecting global positioning system data, map data and vehicle-to-everything data; generating perception information including roadway marking and object information regarding the one or more roadway detected markings and objects; and generating the modified versions of the one or more detected roadway markings and objects based on the perception information.

In other features, the virtual augmentation method further includes: determining statuses of the one or more detected roadway markings and objects; receiving back-office, state, and local requirements for the one or more detected roadway markings and objects; and generating the modified versions of the one or more detected roadway markings based on the statuses of the one or more detected roadway markings and objects and the back-office, state, and local requirements.

In other features, the virtual augmentation method further includes: fusing the perception information, parameters, global positioning system data, map data and vehicle-to-everything data, and back-office, state, and local requirements to generate fused data; and rendering the virtual one or more roadway markings and objects in the field of view based on the fused data.

In other features, the virtual augmentation method further includes: generating a modified version of a detected roadway sign; and via the one or more head-up displays, displaying the modified version of the roadway sign over the detected roadway sign in the field of view.

In other features, the virtual augmentation method further includes: changing a detected guardrail to provide a virtual guardrail; and via the one or more head-up displays, displaying the virtual guardrail closer to a lane of travel of the host vehicle in the field of view.

In other features, the virtual augmentation method further includes: via the one or more head-up displays, displaying chevrons in the field of view; determining at least one of a radius of curvature of an upcoming portion of a road on which the host vehicle is traveling and a speed of the host vehicle; and based on the at least one of the radius and the speed, adjusting spacing between the chevrons.

In other features, the virtual augmentation method further includes: detecting an existing center lane line and an existing edge lane line; generating modified versions of the center lane line and the edge lane line as a virtual center lane line and a virtual edge lane line; and displaying the virtual center lane line and the virtual edge lane line over respectively the existing center lane line and existing edge lane line in the field of view.

In other features, the virtual augmentation method further includes: detecting speed of the host vehicle; based on the speed, determining at least one of widths of virtual lane lines and a distance between the virtual lane lines; and via the one or more head-up displays, displaying the virtual lane lines over existing lane lines in the field of view.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
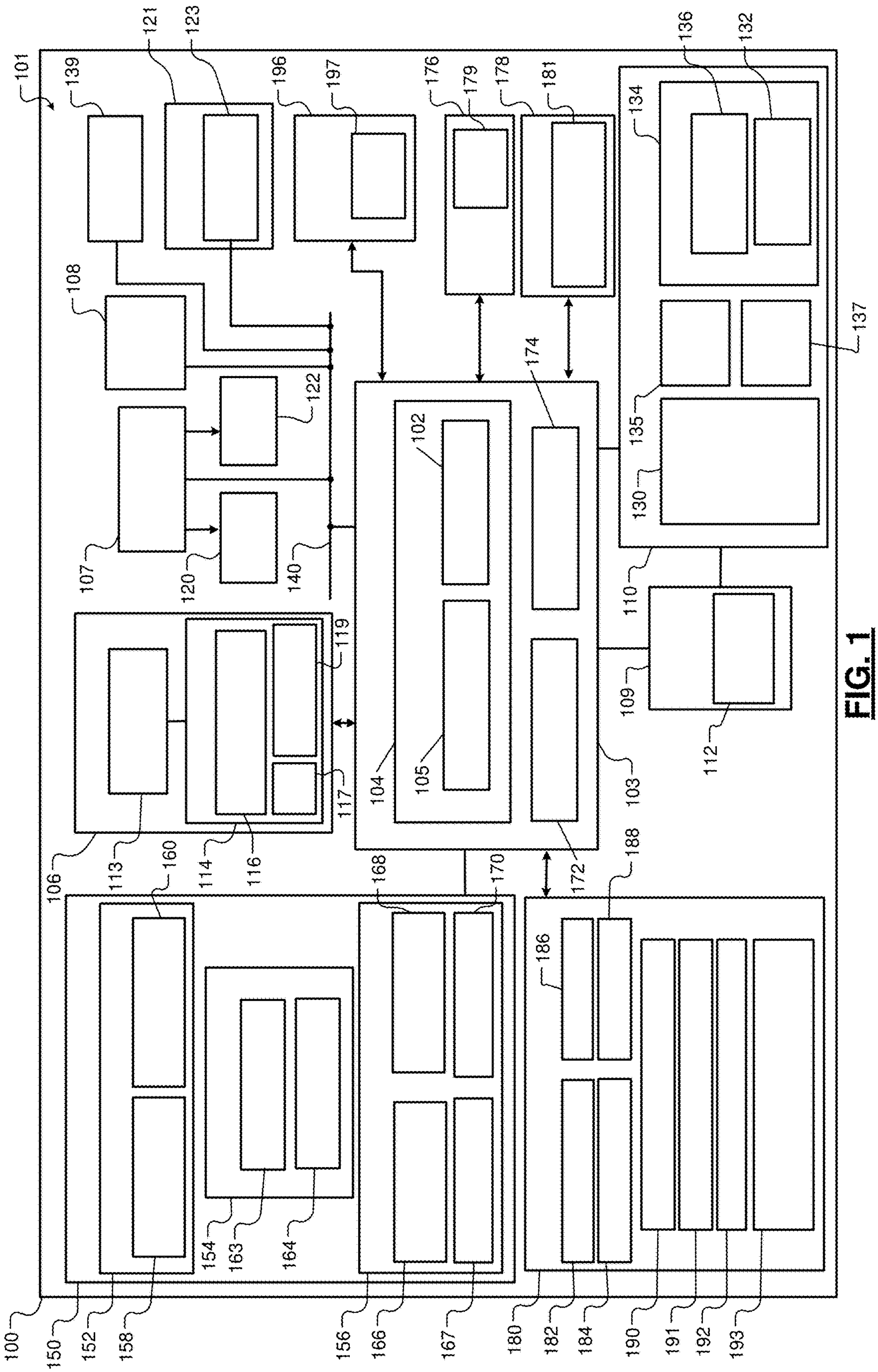
FIG. 1 is a functional block diagram of a vehicle including a virtual augmentation system including a virtual marker and object (VMO) modification module in accordance with the present disclosure.

About half of traffic fatalities in the United States (U.S.) result from roadway departures. Each year, over 1 million crashes occur due to vehicles leaving their lanes. These crashes typically happen on rural and/or curved roads, often while vehicles are traveling at high speeds under conditions of poor visibility or inadequate road markings. Contributing factors may include driver fatigue, driver distraction, or impairment. The crashes can be due to vehicles crossing lane lines including roadway edge lines and center lines and/or otherwise leaving a marked roadway path. Center line pavement markings aid in delineating a roadway and separate opposing directions of travel. The edge lines assist vehicles and vehicle operators in lateral positioning of the vehicles within current travel lanes of the vehicles.

The examples set forth herein include a virtual augmentation system that displays virtual lane markings and objects to aid in preventing a host vehicle from leaving a current lane in which the host vehicle is traveling. One or more HUDs are utilized in the host vehicle to display virtual lane markers and objects overlaid over an environment forward of the host vehicle. The virtual lane markers and objects may be different than and/or modified versions of the lane markers and objects physically in the environment. The virtual lane markers and objects are seen by vehicle occupants as being in the environment but are not actually physically in the environment. The virtual lane markers and objects may be different than actual lane markers and objects in that they are different in size, location, color, pattern, spacing, contrast, brightness, etc. Other example differences are described below. The virtual lane markers and objects may be displayed when certain conditions arise. These modifications and conditions are further described below.

The virtual augmentation system improves driving safety by modifying attributes of augmented pavement markings and roadway objects according to and/or to satisfy: local safety regulations and policies; driver types; rules of a state (e.g., Michigan) of the U.S. in which driving is performed; visibility conditions; vehicle speed; speed limits; locations of other vehicles and objects relative to host vehicles; etc. The attributes are intelligently enhanced based on perception data and information detected and generated by the host vehicles, map data, and applicable standards, such as Federal Highway Administration's Manual on Uniform Traffic Control Devices (MUTCD), including state and local adaptations. The virtual augmentation system enables increases in road safety by modifying attributes of augmented pavement markings such as location, width, and luminance of lane markers. The attributes are adjusted dynamically and can be customized for different users. For example, colors of virtual markings and objects may be selected based on whether a vehicle occupant is color blind and can only see and differentiate between certain colors. Other customized differences can also be made including sizes and patterns of markings and objects. The customization may include selecting whether a marking or object is to be shown constantly, be blinking, and/or be animated to be changing in size, color, pattern, etc.

FIG. 1 shows a host vehicle 100 including a virtual augmentation system 101 including a virtual marker and object (VMO) modification module 102. Some example operations of the virtual augmentation system 101 and the VMO modification module 102 are described below with respect to FIGS. 2-10. The VMO modification module 102 may be implemented in a vehicle control module 103 as shown or may be separate from the vehicle control module 103. The VMO modification module 102 may generate and display virtual lane markings and roadway objects as disclosed herein. The vehicle control module 103 includes a driving module 104 implementing a perception module 105 and the VMO modification module 102. The host vehicle may be a partially or fully autonomous vehicle, a vehicle with assisted driving capabilities, or a non-autonomous vehicle.

The driving module 104 and/or perception module 105 performs: perception (or situation) determining operations; object detection, identification, classification, and graphical and visual identification operations; data look-up, collection, and gathering operations; interaction timing operations; assisted driving operations; image overlay operations; dialog operations including providing speech, text, and/or haptic messages; etc. The perception module 105 may determine the state of the host vehicle 100, environmental conditions, weather, states and locations of other nearby vehicles and objects, etc. The vehicle control module 103 may perform various operations based on determinations made by and/or outputs of the modules 102, 104, 105 and interactions with vehicle occupants such as a driver and/or passengers of the host vehicle 100.

The host vehicle 100 further includes one or more power sources 109, a telematics module 106, an infotainment module 107, other control modules 108 and a propulsion system 110. The vehicle control module 103 may control operation of the host vehicle 100 including the propulsion system 110 and other system described below. The power sources 109 may include one or more battery packs, a generator, a converter, a control circuit, terminals for high and low voltage loads, etc., as well as one or more battery sensors 112 for detecting states of the power sources 109 including voltages, current levels, states of charge, etc.

The telematics module 106 provides wireless communication services within the host vehicle 100 and wirelessly communicates with service providers, network devices (e.g., cloud-based network devices, central office devices, and/or back-office devices), other vehicles, mobile devices, infrastructure devices, and other devices external and/or internal to the host vehicle 100. The telematics module 206 may support Wi-Fi®, Bluetooth®, Bluetooth Low Energy (BLE), Ultra-Wideband (UWB), near-field communication (NFC), cellular, legacy (LG) transmission control protocol (TCP), long-term evolution (LTE), and/or other wireless communication and/or operate according to Wi-Fi®, Bluetooth®, BLE, UWB, NFC, cellular, and/or other wireless communication protocols. The telematics module 106 may include one or more transceivers 113 and a navigation module 114 with a global positioning system (GPS) and GNSS (or Global Navigation Satellite System) receiver 116. The navigation module 114 may include an inertial measurement unit (IMU) 117 and an odometer/wheel sensor 119. The transceivers 113 wirelessly communicate with network devices internal and external to the host vehicle 100 including cloud-based network devices, central stations, back-offices, and portable network devices. The transceivers 113 may perform pattern recognition, channel addressing, channel access control, and filtering operations.

The navigation module 114 executes a navigation application to provide navigation services. The navigation services may include location identification services to identify where the host vehicle 100 is located. The navigation services may also include guiding a driver and/or directing the host vehicle 100 to a selected location. The navigation module 114 may communicate with a central station to collect map information indicating levels of traffic, transportation object identification and locations (e.g., locations and types of signs), path information, weather information, etc. As an example, if the host vehicle 100 is an assisted and/or automated driving vehicle, the navigation module 114 may direct the vehicle control module 111 along a selected route to a selected destination. The GPS and GNSS receiver 116 may provide: location information; velocity and/or direction (or heading) of the host vehicle 100, other vehicles, and objects (e.g., pedestrians and cyclists); and/or global clock timing information.

One or more HUDs (also referred to as augmented reality (AR) HUDs) 121 are included and may include one or more HUD control module(s) (one HUD control module 123 is shown). The HUD control module 123 is in communication with the modules 102, 103, 104 and displays the virtual lane markings and objects. The VMO modification module 102 may be implemented separate from or as part of the HUD control module 123.

The infotainment module 107 may include and/or be connected to an audio system 122 and/or a video system including one or more displays. The displays 120, 121 and audio system 122 may be part of a human machine interface. The displays 120, 121 may include cluster and/or center console displays, etc. Haptic devices (e.g., steering wheel and/or seat vibration devices) may be used in addition to the displays 120, 121 and the audio system 122 to interact with a vehicle occupant such as a driver or passenger. This interaction is further described below. Messages may be displayed, audibly played out, and/or indicated via the displays 120, 121, the audio system 122, the haptic devices, and/or via one or more other output devices.

The infotainment module 107 may provide various information, warnings, and proactive messages including: status information; routing information, re-routing information, questions whether the host vehicle 100 should re-route from a current path to another path; whether driving operations are autonomously controlled, limited and/or prevented; gear shifter status; upcoming and currently being performed operations (e.g., braking, accelerating, turning operations); detected objects (or obstacles); vehicle status information; diagnostic information; prognostic information; entertainment features and information; etc. The infotainment module 107 may be used to guide a vehicle operator to a certain location, indicate trip estimations (e.g., distances to selected destinations), and other information.

The propulsion system 110 may include one or more torque sources, such as one or more motors and/or one or more engines (e.g., internal combustion engines). In the example shown in FIG. 1, the host vehicle 100 includes an engine 130 and one or more motors 132. The torque sources are independently controlled. The propulsion system 110 includes a motor control system 134 that includes the one or more motors 132 and a motor control module 136 that may control operation of the one or more motors 132 based on signals from the vehicle control module 111. The propulsion system 110 may include a gear selector and/or shifter 135 for setting a gear of a transmission 137 and/or for setting a drive state of one or more of the torque sources. The gear selector and/or shifter 135 may be an electronic selector (e.g., one or more electrical switches), a mechanical and/or electrical shifter, or other selector and/or shifter. The propulsion system 110 may be controlled based on position of an accelerator 139 (e.g., an accelerator pedal, a throttle plate, etc.).

The modules 102-108 and 123 may communicate with each other directly or indirectly via one or more buses 140, such as a controller area network (CAN) bus and/or other suitable interface. The vehicle control module 103 may control operation of vehicle modules, devices and systems based on feedback from sensors 150 and information and/or instructions received from a cloud-based network device.

The sensors 150 may include exterior sensors 152, interior sensors 154, and other sensors 156. The exterior sensors 152 may include radar and/or lidar sensors 158 and imaging and audio devices (e.g., visual spectrum cameras, long-wave infrared cameras, short-wave infrared cameras, ambient light sensors, and microphone or microphone array) 160. The exterior sensors 152 may be used to detect objects external to the host vehicle 100 and/or in a path of the host vehicle 100. The objects may include lane markings and objects, other vehicles, pedestrians, bicyclists, etc.

The interior sensors 154 may include one or more interior imaging sensors (e.g., cameras) 163, and a microphone or microphone array 164. The interior sensors 154 may be part of a driver monitoring system (DMS). The cameras 163 may be used to detect, track and/or monitor vehicle occupants including detecting locations of vehicle occupants in the vehicle, anatomical features (e.g., face, arms, hands, legs, etc.) of the vehicle occupants, head locations and/or eyes, etc. The interior sensors 154 may be used to detect gaze directions of a driver and/or vehicle occupants. The interior sensors 154 may include door sensors, seat belt sensors, seat sensors, etc. The door sensor may indicate whether a door is open or closed. The seat belt sensors may indicate whether seat belts are buckled. The seat sensor may include, for example, load sensors, strain gauges, and/or piezoresistive or piezoelectric sensors for detecting whether an occupant is in a particular seat and the weight of the occupant.

The other sensors 156 may include a gear selector and/or shifter sensor 167, a vehicle speed sensor 166, acceleration sensors (e.g., longitudinal and lateral acceleration sensors) 168, and a fuel level sensor 170, as shown, and other sensors such as an inclinometer, an engine temperature sensor, and an engine oil pressure sensor. Additional sensors may also be included such as brake system sensors (a brake sensor 179 is shown) and steering system sensors (a steering angle sensor 181 is shown). The gear selector and/or shifter sensor 167 generates a signal indicative of a state of the gear selector and/or shifter 135.

The driving module 104 may use machine learning for facial recognition, determining locations of occupant limbs, for anatomical feature recognition, object classification including to identify and/or classify pedestrians, cyclists, and vehicles (e.g., oncoming traffic), roadway markings and objects, as well as for probable trajectory determination of each detected, identified and/or classified object. The driving module 104 may determine the locations of objects based on feedback from the sensors 150.

The vehicle control module 103 may also include a mode selection module 172 and a parameter adjustment module 174. The parameter adjustment module 174 may be used to adjust parameters of the host vehicle 100. The vehicle control module 103 may perform autonomous operations based on interaction with a vehicle occupant. As an example, the vehicle control module 103 may operate in a fully or partially autonomous mode and may control the propulsion system 110, a brake system 176, and a steering system 178. In an embodiment, the vehicle control module 103 controls operation of the systems 110, 176 and 178 based on or without interactions with a vehicle occupant. The vehicle control module 103 may i) perform autonomous operations such as steering, braking, accelerating, etc., and/or ii) display and/or audibly playout messages, perform haptic operations via haptic devices, and/or output messages and/or corresponding signals via other output devices.

In an embodiment, the driving module 104 uses computer vision, machine learning and cloud computing to identify, communicate, and evaluate scenarios where a moving host vehicle should yield to pedestrian(s), an obstructed roadway, and/or oncoming (right-of-way) traffic. The driving module 104 visualizes and takes into consideration in real-time pedestrians, roadway obstructions and oncoming traffic and performs operations to provide enhanced situation awareness to vehicle occupants.

The driving module 104 is configured to perceive the road ahead and surrounding areas based on outputs of sensors (e.g., cameras, radar sensors, and/or lidar sensors) and vehicle-to-everything (V2X) communication including vehicle-to-vehicle communication, vehicle-to-mobile device communication, vehicle-to-infrastructure communication, and other communication (e.g., vehicle to distributed network communication).

The host vehicle 100 may further include the memory 180. The memory 180 may store sensor data 182, parameters 184, applications 186, algorithms 188, historical data 190, on-board inputs 191, off-board inputs 192 from other devices external to the host vehicle 100 and other data 193. The sensor data and parameters may include occupant locations, occupant weights, occupant heart rates, vehicle location, vehicle speed, vehicle acceleration, battery state of charge, fuel level, etc. applications 186. The applications 186 may include applications executed by the modules 102-108.

Although the memory 180 and the vehicle control module 103 are shown as separate devices, the memory 180 and the vehicle control module 103 may be implemented as a single device. The memory 180 may also store historical data 190 and other data 193 such as driver driving patterns, driver fueling patterns, driver stopping patterns, driver pickup patterns, other driver patterns, data collected by and/or generated by at least one of the modules 102-106, traffic data, navigation data, map data, GPS/GNSS data, path data, speed data, and acceleration data, etc.

The vehicle control module 103 may control operation of the propulsion system 110, the video system including the display 120, 121, the audio system 122, the haptic devices, the brake system 176, the steering system 178, a seating system 196, and/or other devices and systems according to parameters set by the modules 102-108, 174. The seating system 196 may include seat sensors 197 for detecting presence of an occupant and/or change in occupants, for example, change in a driver. The vehicle control module 103 may set at least some of the parameters based on signals received from the sensors 150.

The vehicle control module 103 may receive power from the power sources 109, which may be provided to the propulsion system 110, the brake system 176, the steering system 178, the seating system 196, etc. Power supplied to the haptic devices, the motors 132, the brake system 176, the steering system 178, the seating system 196, and/or actuators thereof may be controlled by the vehicle control module 103 to, for example, adjust: motor speed, torque, and/or acceleration; braking pressure; steering wheel angle; pedal position; state of haptic devices; etc. This control may be based on the outputs of the sensors 150, the navigation module 114, the GPS and GNSS receiver 116, the data and information received from external devices, and the data and information stored in the memory 180.

The vehicle control module 103 may determine various parameters including a vehicle speed, a motor speed, a gear state, an accelerator position, a brake pedal position, an amount of regenerative (charge) power, an amount of auto start/stop discharge power, and/or other information. The vehicle control module 103 may control operations of the systems 110, 176, 178 based on the stated parameters. The driving module 104 may display vehicle status information based on the stated parameters.

The host vehicle 100 can include various systems for assisting a driver, for performing autonomous operations, and/or for indicating to a vehicle occupant information regarding an environment of the host vehicle. For example, a host system may include a navigation system that provides map information indicating lane boundaries, street locations, speed limits, geographical locations of selected destinations, etc. The host system may provide the driver with instructions for driving to a selected destination and/or may perform autonomous operations such as braking, steering, and accelerating operations to drive the vehicle to the destination based on the map information.

As another example, the host vehicle 100 may include object detection and collision warning systems for detecting impending objects and performing countermeasures and/or taking evasive action to prevent a collision. The vehicle control module 103 determines locations of the objects relative to the host vehicle 100 and trajectories of the objects and the host vehicle 100. If it is determined that the host vehicle 100 is likely to collide with one of the objects, one or more warning signals may be generated to indicate to the driver and/or the object of concern of the potential collision. These warnings may be provided in addition to digital gateways and other information described herein. The vehicle control module 103 may also or alternatively perform one or more other countermeasures (e.g., apply brakes to decelerate the host vehicle, change a steering angle of the host vehicle, etc.) to prevent a collision.

Figure 2:
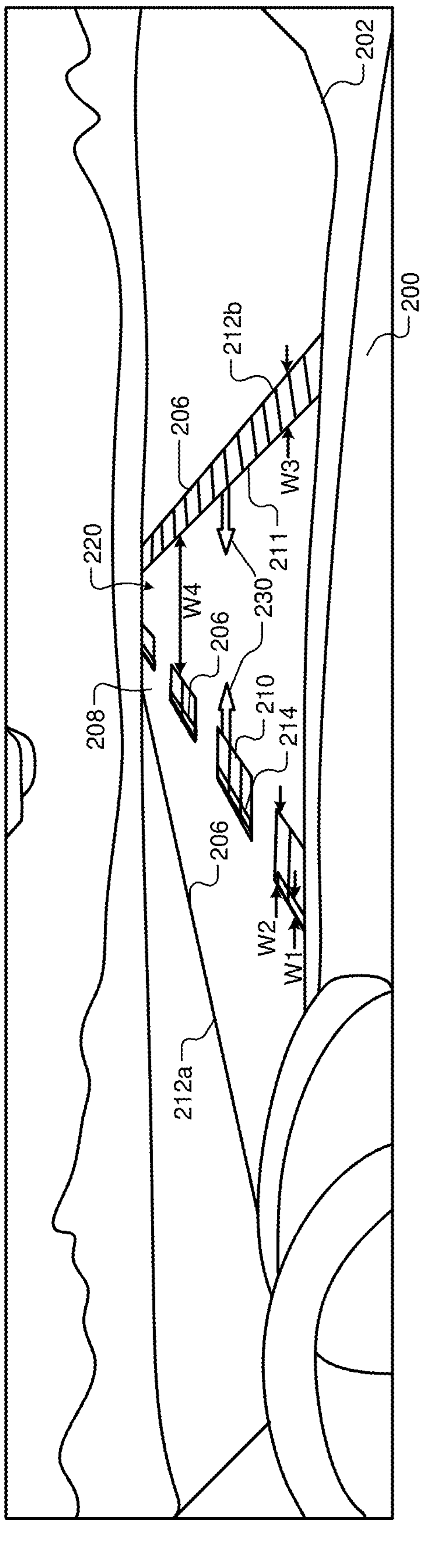
FIG. 2 is a front view from an interior of a vehicle illustrating overlaid, enlarged, and shifted lane markers in accordance with an embodiment of the present disclosure.

FIG. 2 shows a front view from an interior of a vehicle illustrating overlaid, enlarged, and shifted lane markers. A dashboard 200 and windshield 202 of the vehicle are shown. Through the windshield 202 a vehicle occupant is able to see lane markings 206 that are physically on a roadway 208. A HUD of the vehicle is displaying virtual center and edge lane markers 210, 211, which are overlaid over the lane markings 206. The lane markings 206 include roadway edge lines (also referred to as outer lane edges) 212*a*, 212*b* and a dashed center line 214. The lane markers 210, 211 are shown as having a hatched pattern to illustrate that the lane markers 210, 211 may be a different color than the center line 214 and edge lines 212*a*, 212*b*. The dashed center line 214 indicates that the host vehicle is in a passing area and is permitted to pass a vehicle forward of the host vehicle. The virtual center lane marker 210 has a width W1 that is wider than a width W2 of the center lane line (or marker) 214. The virtual edge lane marker 211 has a width W3 similar to the center lane line 214. The virtual lane markers 210, 211 effectively narrow the perceived width W4 of the lane 220. In an embodiment, the widths W2, W3 and/or W4 are based on speed of the host vehicle. The higher the speed, the larger W2 and/or W3 and/or the smaller W4, such that the distance between 210, and 211 narrows.

As an example, if a host vehicle is speeding and approaching a passing area and/or a curve (or bend) in the road being traveled, virtual lane markers may be displayed that are larger, wider, have a different pattern, have a different color, etc. than current actual physical lane markers. The virtual lane markers may be shown in a more conspicuous manner to create a perception of a narrower road and/or lane of travel. The brightness and/or contrast of the virtual lane markers may be increased from baseline brightness and/or contrast levels of, for example, the actual physical lane markers. The brightness and/or contrast levels of the actual physical lane markers may be determined based on, for example, captured images of the roadway. Arrows 230 are shown, but not actually displayed. The arrows 230 are indicative of the lane narrowing in width.

Although the outer lane edges 212*a*, 212*b* are shown, the roadway 208 may have lane edge lines having certain width. For example, the lane edge lines may be 4-5 inches in width and the virtual edge lane marker 211 may be wider as to, for example, extend over the outer lane edge (or line) 212*b* and closer to the center line 214 than the outer lane edge 212*b*. The virtual center lane marker 210 is wider than the center lane line 214 and extends closer to the outer lane edge 212*b* than the center lane line 214. In an embodiment, the left edge of the virtual center lane marker 210 is overlaid on a left edge of the center lane marker 214. As a result, the virtual center lane marker 210 does not extend to the left past the left edge of the center lane line 214. As an example, widening the center lane marker (or center line) and each of the edge lane markers (or edge lines) from 4 inches to provide virtual center and edge lane markers being 5 inches wide can provide an annual 14% reduction in opposite direction crashes for 2-lane rural roads. As another example, widening edge lane markers (or edge lines) from 4 inches to virtual edge lane markers being 6 inches wide can result in a 53% reduction in annual opposite direction crashes for 2-lane rural roads.

The virtual lane markers (or pavement augmentation) may be generated and displayed based on context in order to improve safety of a host vehicle and occupants therein. The location, visibility, width, color, type (e.g., solid, dashed, contrast ratio, etc.), pattern, etc. may be selected by, for example, the VMO modification module 102 of FIG. 1 based on context. The location may refer to the lateral and/or vertical positioning of the virtual lane markers and/or roadway objects displayed. The visibility of the virtual lane markers may refer to luminance levels of the virtual lane markers and/or other objects displayed. The context may refer to: local laws, regulations, and policies; driver state (e.g., teenager, distracted, elder, impaired, etc.), ambient light level and visibility; vehicle speed (at speed limit or above the speed limit); amount of traffic and other road users and locations of other vehicles and objects relative to the host vehicle; and driver customization and historical preferences including driver vision (or visual acuity).

Figure 3:
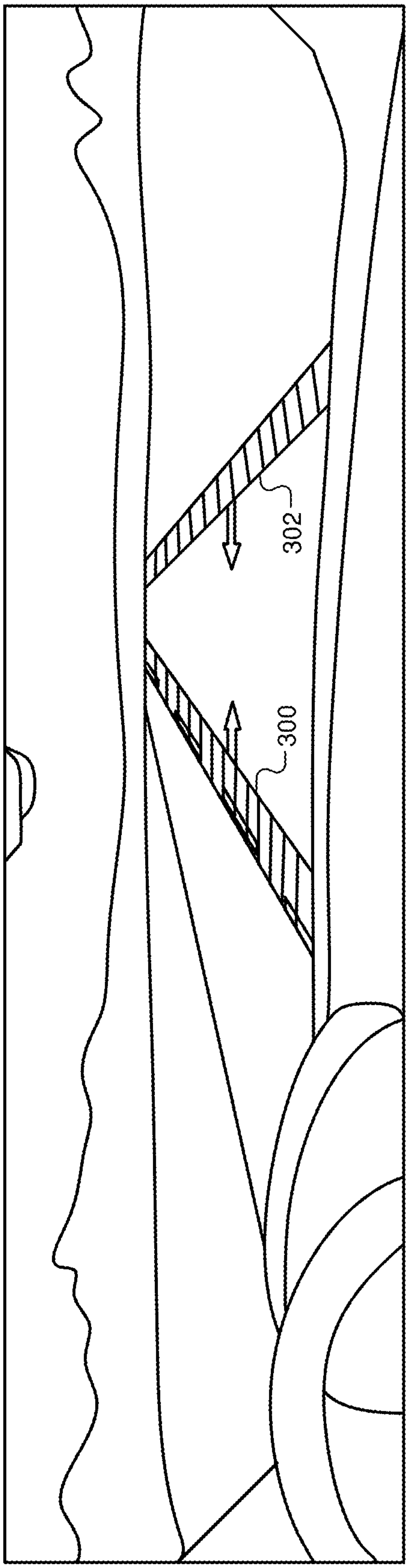
FIG. 3 is a front view from an interior of a vehicle illustrating overlaid, enlarged, shifted and type modified lane markers in accordance with another embodiment of the present disclosure.

FIG. 3 shows a front view from an interior of a vehicle illustrating overlaid, enlarged, shifted and type modified lane markers. FIG. 3 is similar to FIG. 2, except the virtual center lane marker 300 is not dashed as is the virtual center lane marker 210. In an embodiment, the virtual center lane marker 300 is not dashed because the VMO modification module 102 of FIG. 1 has been instructed that an oncoming vehicle is approaching and thus it is unsafe to pass and overtake another vehicle even though the actual physical center line painted on the roadway indicates that passing is permitted. The host vehicle via object detection sensor(s) and/or vehicle-to-everything (V2X) communication may detect the oncoming vehicle and the VMO modification module 102 may make the virtual center lane marker 300 a solid line to indicate to the driver not to pass.

Figure 4:
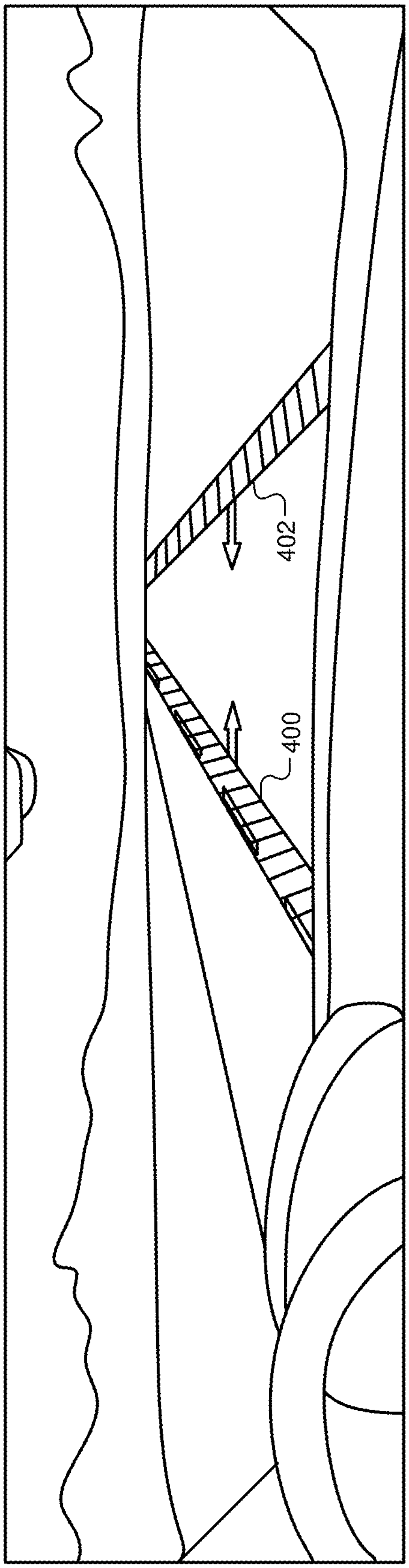
FIG. 4 is a front view from an interior of a vehicle illustrating overlaid, enlarged, shifted and type modified lane markers in accordance with yet another embodiment of the present disclosure.

FIG. 4 shows a front view from an interior of a vehicle illustrating overlaid, enlarged, shifted and type modified lane markers. FIG. 4 is similar to FIG. 3, except the color of the virtual center lane marker 400 is different than the color of the virtual center lane marker 300 of FIG. 3. This is illustrated by different hatching of the virtual center lane markers 300, 400. As an example, the center lane marker 300 may be white in color and the center lane marker 400 may be yellow or orange in color. The edge lane marker 302 and edge lane marker 402 of FIGS. 3 and 4 may be the same color (e.g., white, yellow, or orange). The markers 300, 302, 400, 402 are superimposed on the roadway based on: a latest MUTCD; state rules, regulations, and/or policies; and/or other criteria. This includes the sizing, types, patterns, widths, and colors of the markers 300, 302, 400, 402. The VMO modification module 102 may select from lists of permitted sizes, types, patterns, widths, colors, etc. The selected sizes, types, patterns, widths, colors, etc. may be the same or different than the sizes, types, patterns, widths, colors, etc. of the physical center and edge lane lines.

In an embodiment, center lines and edge lines of a roadway are modified by overlaying virtual updated center lines and edge lines based on a driver's vision (e.g., low vision, color blind, etc.). Customization is implemented to display virtual center lines and edge lines that are clearly visible to the particular driver and based on preferences of that driver. The luminance, color, and contrast of lane markers may be adjusted and enhanced for individuals with low vision, color blindness, or as customized by the driver. As an example, if a driver is unable to see a certain color and/or distinguish between two colors, then colors are selected that the driver can see and distinguish between. Color rendering may be adjusted to ensure maximum contrast with respect to road pavement color and ambient lighting conditions. Contrast between the lane markers and pavement as well as lane marker color accuracy is estimated from front camera images (i.e., maximize color distance (or difference in color) between virtual markings and pavement). If the contrast between the lane markers and the pavement is changing, the AR HUD is controlled to compensate for this and provide a consistent driver experience.

Figure 7:
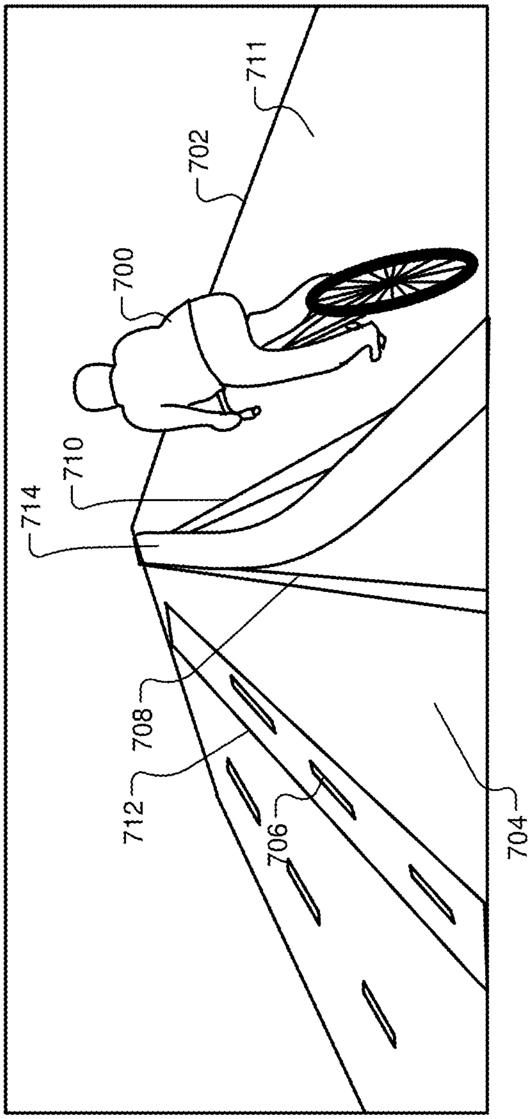
FIG. 7 is a front view from an interior of a vehicle illustrating overlaid, enlarged, shifted and pattern modified lane markers in accordance with a further embodiment of the present disclosure.
Figure 8:
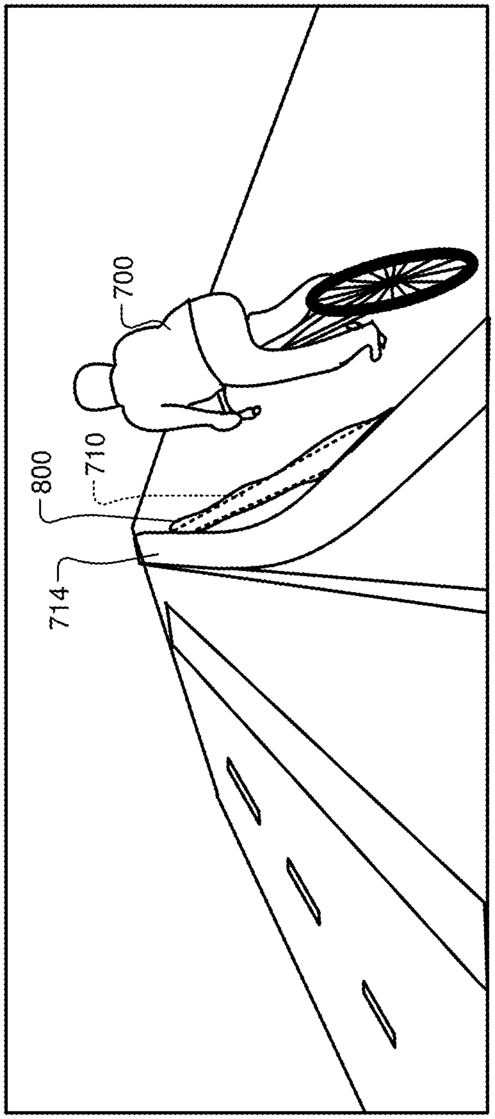
FIG. 8 is a front view from an interior of a vehicle illustrating a blurred lane marking and the overlaid, enlarged, shifted and pattern modified lane markers of FIG. 7 in accordance with another embodiment of the present disclosure.

In an embodiment, center and edge lines are moved and/or widened according to road and traffic conditions. The center and edge lines may be moved, widened and/or changed in shape such that the host vehicle stays farther from the edge and/or slows down. The center and edge lines may be modified: in response to anticipated road geometry (e.g., narrow to slow down); in response to low vigilance and poor lane keeping, and to avoid another road user (e.g., overpassing a truck, a cyclist). An example illustrating overpassing a cyclist is shown in FIGS. 7-8.

Figure 5:
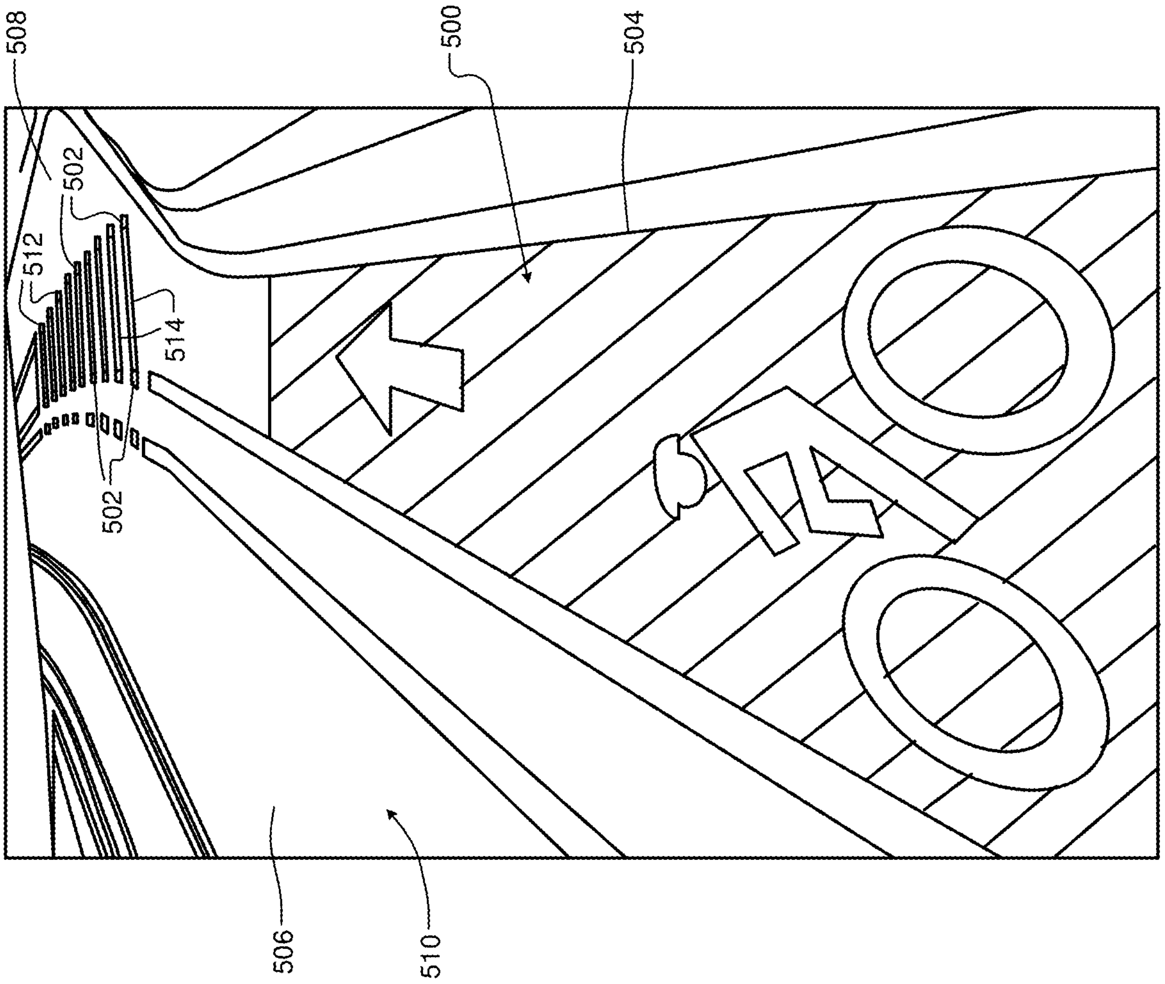
FIG. 5 is a front view from an interior of a vehicle illustrating overlaid and colored pavement pattern and high contrast color-edged markers in accordance with yet another embodiment of the present disclosure.

FIG. 5 shows a front view from an interior of a host vehicle illustrating overlaid and colored pavement pattern 500 and high contrast color-edged markers 502. The colored pavement pattern 500 may be for example green in color and the high contrast color-edged markers 502 may be for example white in color. The hatching of the pavement pattern 500 is provided to represent the green color. In the example shown, a bike lane 504 is shown, which passes over an intersection between a first roadway 506 and an exit lane 508. The overlaid and colored pavement pattern 500 is provided to make a certain area of a bike lane more noticeable to a driver of the host vehicle, which is in the nearby lane 510. The high contrast color-edged markers 502 are overlaid over ends of bike path intersection lines 512 to make the intersection where bikers may pass more noticeable. The high contrast color-edged markers 502 have higher contrast ratios than, for example, center portions 514 of the bike path intersection lines 512.

In an embodiment, virtual lines extending between respective pairs of the high contrast color-edged markers 502 are overlaid over the bike path intersection lines 512. The virtual lines and the high contrast color-edged markers 502 are wider and/or longer than the actual physical bike path intersection lines that are physically on the pavement.

In an embodiment, the VMO modification module 102 of FIG. 1 measures a road's lane marking width, length, color, brightness level, contrast ratio, etc. from map data and/or from captured images via one or more exterior cameras. The VMO modification module 102 then checks for a required and/or recommended width, length, color, brightness level, contrast ratio, etc. and/or ranges thereof from a local policy for a GNSS location of the lane marking. The VMO modification module 102 then adjusts the width, length, color, brightness level, contrast ratio, etc. while satisfying the local policy requirements and ranges and displays a virtual lane marking having the adjusted width, length, color, brightness level, contrast ratio, etc. This may include measuring widths of space (or gaps) between segments of dashed lane markings and/or between lane markings such as gaps between bike lane intersection lines; update the spacing according to the latest policy and/or to make the markings more noticeable to a viewer, and generates and displays virtual lane markings based on the updates.

Figure 6:
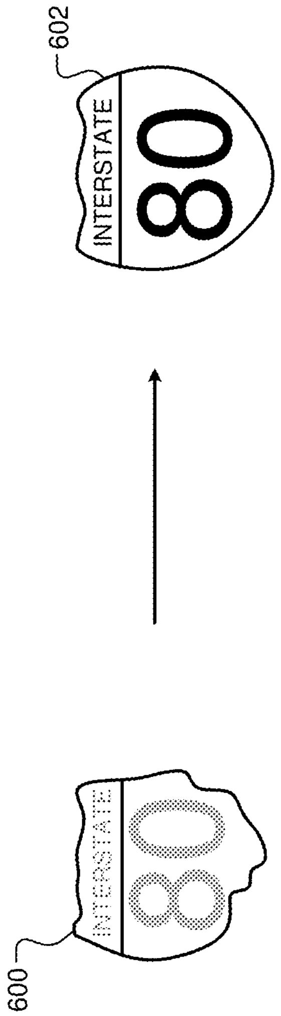
FIG. 6 is a front view from an interior of a vehicle illustrating an example of virtual roadway sign reconstruction in accordance with an embodiment of the present disclosure.

The VMO modification module 102 may increase width, length, color, brightness and contrast ratio of roadway lines to increase saliency of the lines b overlaying modified virtual roadway lines over the actual roadway lines in a driver (or vehicle occupant's) field of view. In an embodiment, the VMO modification module 102 may determine, based on map data, GNSS data, V2X data, perception data, local rule, regulation and/or policy information and/or other data and information, that there is a style conformance issue with a roadway marking (e.g., lane or line) and/or object (e.g., a sign). Updated roadway marking and/or object is virtually displayed over the corresponding roadway marking and/or object to correct the non-conformance issue such that the roadway marking and/or object is in conformance. For example, a lane or intersection line that is seen as a solid and/or non-segmented line may be modified and displayed as a line with end segments and an intermediate segment, similar to the lines 512 of FIG. 5. Different methods may be used to transform perception and map data into desired visualizations. FIG. 6 is an example of a roadway sign that is being corrected. The VMO modification module 102 may reconstruct deteriorated painted road markings such as road numbers, turn arrows, blocked-out areas, cross hatched areas, etc. These and other rendering techniques to dynamically render standards compliant road features are disclosed herein.

FIG. 6 shows a front view from an interior of a vehicle illustrating an example of virtual roadway sign reconstruction. A front view of a damaged road sign 600 is shown and an updated view after overlaying a virtual road sign 602 over the damaged road sign in a field of view of a driver of a vehicle. The VMO modification module 102 of FIG. 1 may detect the road signal, determine that the road sign is damaged and overlay an updated road sign that does not look damaged. As a result, the driver of the host vehicle is able to see an undamaged and unblemished road sign and the information indicated on that sign. The virtual road sign 602 may be the same size or larger than the damaged road sign 600. One or more other aspects of the virtual road sign 600 may also be different than the virtual road sign 602.

FIG. 7 shows a front view from an interior of a vehicle illustrating overlaid, enlarged, shifted and pattern modified lane markers. A cyclist 700 is shown on a roadway 702. The cyclist 700 is outside of a lane 704, which is marked by outer edge lane lines 706, 708. The cyclist 700 is outside of a bike lane line 710 and in a bike path 711. In the example shown, the left outer edge lane line 706 and the bike lane line 710 are modified by overlaying a first virtual outer edge lane line 712 and a second virtual (outer or bike) lane line 714 respectively over the lane lines 706 and either lane line 708 or lane line 710. The curvature of the outer edge lane line 708 and/or the virtual bike lane line 714 may be modified to keep the host vehicle further away from the cyclist 700. In the example shown, the bike lane line 710 is modified.

In an embodiment, the existing outer edge lane line 708 or the bike lane line 710 is covered by an image to make the lane line look blurred out. An example of this is shown in FIG. 8. FIG. 8 is similar to FIG. 7, except a blurred lane marking 800 is shown that is overlaid over a portion of the bike lane line 710. In another embodiment, the portion is made less visible by rendering pavement color over the portion of the existing edge lane line 710 that is not covered by the virtual bike lane line 714. The rendered updated virtual bike lane line is curved around the location of the obstacle (or cyclist) 700. Black is not a color that can be projected. Thus, objects having colors other than black may be projected over certain lane lines (or markers) to, for example, make portions of the lane lines looked blurred out and/or less noticeable.

Figure 9:
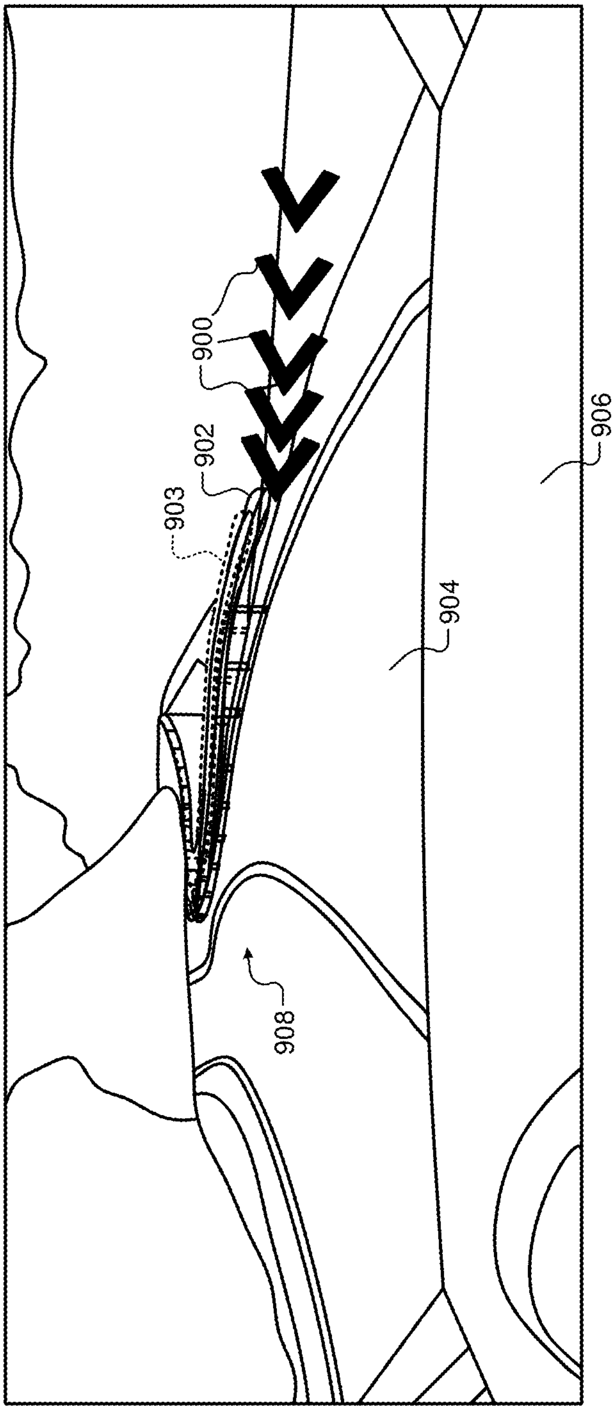
FIG. 9 is a front view from an interior of a vehicle illustrating overlaid chevrons with varied spacing and an overlaid and moved guardrail in accordance with another embodiment of the present disclosure.

FIG. 9 shows a front view from an interior of a vehicle illustrating overlaid chevrons 900 with varied spacing and an overlaid and moved guardrail 902. The overlaid and moved guardrail 902 is a modified version of a detected guardrail 903. The guardrail 903 is shown with dashed lines. In the example shown, the modified guardrail 902 is larger, moved inward relative to the guardrail 902 and a lane 904, and more prevalent and visible to a driver of a host vehicle than the guardrail 903. A dashboard 906 of the host vehicle is shown. The guardrail 903 may be blurred out or colored over to be less visible. The VMO modification module 102 is configured to render guardrails based on roadside topography (e.g., based on a drop-off at or near road edge) and/or based on one or more other parameters.

In an embodiment, the spacing between chevrons is set and adjusted based on road curvature and speed of the host vehicle. The closer the host vehicle gets to a curve 908 in the road, the smaller the spacing between the chevrons 900. In an embodiment, when the road curvature ahead has a radius less than a predetermined radius (e.g., 10 meters) and speed of the host vehicle is greater than a predetermined speed (e.g., 45 miles per hour (mph)), than the spacing between chevrons is decreased, as shown in FIG. 9. In an embodiment, the distance between adjacent chevrons is directly proportional to the radius of road curvature and the speed of the host vehicle. The higher the speed of the host vehicle and the smaller the radius of curvature of the road, the closer the chevrons. Any number of chevrons may be displayed. The chevrons may be displayed in absence of or in addition to roadside signage. The chevrons may be displayed based on MUTCD requirements and be supplemented with virtual signage if there is missing, damaged or inadequate physical signage, as disclosed herein. Information may be displayed on an augmented reality (AR) HUD and/or on an AR cluster, where a video of the road appears in the cluster display and the augmented reality information is overlaid directly on the image. The AR cluster enhances information displayed on an instrument cluster of the host vehicle.

The chevrons and modified guardrail may be provided to keep the host vehicle further away from an outer edge of the road than if the chevrons and modified guardrail were not displayed. There may be a drop off (or cliff) near the outer edge of the road, hence use of a guardrail. Similar modifications can be made for bridge rails and/or other objects that are present to prevent and/or deter a host vehicle from crossing a certain boundary line.

Figure 10:
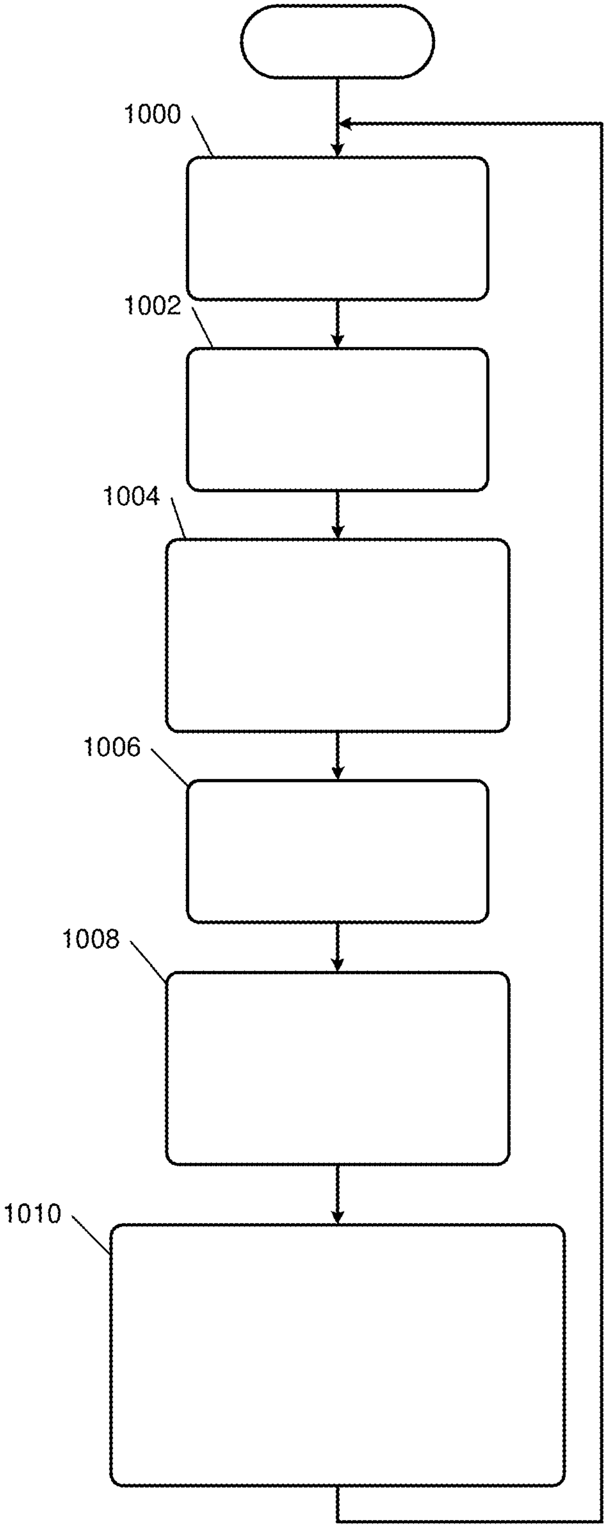
FIG. 10 illustrates a method of displaying modified virtual lane markers and objects in a view of a vehicle occupant via one or more HUDs in accordance with the present disclosure.

FIG. 10 shows a method of displaying modified virtual lane markers and objects in a view of a vehicle occupant via one or more HUDs. The method may be implemented by the virtual augmentation system 101 of FIG. 1. The following operations may be iteratively performed.

At 1000, the VMO modification module 102 collects sensor data, GNSS/GPS data, map data, and V2X data.

At 1002, the perception module 105 generates perception data (or information) based on the sensor data, GNSS/GPS data and map data. This includes detecting and/or predicting locations, colors, types, patterns, brightness levels, contrast ratios, luminance levels, etc. of roadway markings and objects including lane lines, road signs, intersection lines, guardrails, and/or other roadway marking and object information. The perception data and V2X data may be provided to a cloud-based network device, such as a back-office network device or service-provider network device and stored as base map data. The cloud-based network device may also store regional safety policy requirements for roadway markings and objects including, for example, size, width, length, style, type, pattern, reflectivity, rumble strip frequency, brightness, contrast ration, luminance, location, etc. of the roadway markings and objects. This may also include locations and types of signage and information to be indicated on the signage. The cloud-based network device may further store back-office and/or service provider (or manufacturer of the host vehicle) requirements, which may be used in combination with the regional safety policy requirements to provide transformation requirements and/or instructions for roadway marking and object (referred to as features) transformation. This transformation refers to the modifying of roadway markings and objects and/or the virtual displaying of the roadway markings and objects via one or more HUDs of the host vehicle. The transformation requirements and instructions may be stored in the cloud-based network device and/or shared with the host vehicle and thus stored in memory of the host vehicle.

At 1004, the VMO modification module 102 determine statuses of roadway markings and objects. This may include determining status of the roadway markings and objects such as: quality of the roadway markings and objects; visibility of the roadway markings and objects; whether the roadway markings and objects are damaged, covered, missing, etc.

At 1006, the VMO modification module 102 receives and/or obtains back-office, state and local city requirements for roadway markings and objects (e.g., signs and guardrails). In an embodiment, this includes receiving the transformation requirements and/or instructions from the cloud-based network device. The requirements and/or instructions may be received via the telematics module 106. The host vehicle may receive requirements for size, color, type, pattern, location, width, length, shape, brightness level, contrast ratio, luminance level, frequency, spacing, etc. of the roadway markings and objects and/or ranges thereof. This information may be received from a back-office and/or other cloud-based network device.

At 1008, the VMO modification module 102 may fuse the perception information, sensor data, GNSS/GPS data, map data, V2X data, and back-office, state and local city requirements to provide fused data that is host vehicle centric. Map feature type and policy requirements are fused with perception (vehicle-centric) data. This may be done in real-time.

At 1010, the VMO modification module 102 renders virtual roadway markings and objects based on the fused data, navigation information, customization settings, driver (or occupant) eye locations and detected gaze direction, vehicle parameters, environmental conditions, detected objects, state of upcoming roadway including states of corresponding roadway markings and objects. The virtual roadway markings and objects may be generated and displayed as disclosed herein including any of the embodiments described with respect to FIGS. 1-9. This may include alerts such as text messages, virtual warning signs (e.g., display of virtual hazard sign), etc.

Markings and signage may be displayed, changed, and/or corrected. In an embodiment, lane markings and/or road signs are modified and/or corrected as described herein. In an embodiment, virtual images are displayed in the correct locations when roadway markings are missing and/or mislocated. This may include displaying, for example, missing signs or signs in the correct location and blurring out or covering signs that are in wrong locations or in locations typically confusing to drivers. In another embodiment, the vehicle control module 103 assists a driver of the host vehicle and/or partially or fully autonomously controls operation of the host vehicle based on the rendered roadway markings. For example, the vehicle control module 103 may keep the host vehicle between a rendered center lane marking and a rendered edge lane marking.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML 5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A virtual augmentation system comprising:

one or more head-up displays configured to display virtual images over an environment forward of a host vehicle;

a plurality of sensors configured to determine a plurality of parameters indicative of a state of the host vehicle;

a telematics module configured to obtain roadway information indicative of roadway markings and objects along a predicted path of the host vehicle; and a virtual marker and object modification module configured based on the plurality of parameters and the roadway information, i) to detect one or more roadway markings and objects, ii) to generate modified versions of the one or more detected roadway markings and objects as one or more virtual roadway markings and objects, and iii) via the one or more head-up displays, to overlay the virtual one or more roadway markings and objects over at least a portion of the one or more detected roadway markings and objects in a field of view of an occupant of the host vehicle, wherein the virtual marker and object modification module is configured to widen one or more lane lines and, via the one or more head-up displays, to display the widened lane lines over detected and existing lane lines in the field of view.

2. The virtual augmentation system of claim 1, wherein the virtual marker and object modification module is configured to modify one or more lane lines including changing at least one of color, brightness, contrast ratio, and luminance of the one or more lane lines and, via the one or more head-up displays, to display the modified one or more lane lines over detected and existing lane lines in the field of view.

3. The virtual augmentation system of claim 1, wherein the virtual marker and object modification module is configured to change one or more portions of the one or more detected roadway markings and objects and, via the one or more head-up displays, to display the changed one or more portions over the one or more detected roadway markings and objects in the field of view.

4. The virtual augmentation system of claim 1, wherein the virtual marker and object modification module is configured to change one or more portions of one or more roadway markings and, via the one or more head-up displays, to display the changed one or more portions over detected and existing roadway markings in the field of view.

5. The virtual augmentation system of claim 1, wherein the virtual marker and object modification module is configured to generate a modified version of a detected roadway sign and, via the one or more head-up displays, to display the modified version of the roadway sign over the detected roadway sign in the field of view.

6. The virtual augmentation system of claim 1, wherein the virtual marker and object modification module is configured to render a virtual guardrail in the field of view.

7. The virtual augmentation system of claim 1, wherein the virtual marker and object modification module is configured to change a detected guardrail to provide a virtual guardrail, and via the one or more head-up displays, display in the field of view the virtual guardrail closer to a lane of travel of the host vehicle than the detected guardrail.

8. A virtual augmentation system comprising:

one or more head-up displays configured to display virtual images over an environment forward of a host vehicle;

a plurality of sensors configured to determine a plurality of parameters indicative of a state of the host vehicle;

a telematics module configured to obtain roadway information indicative of roadway markings and objects along a predicted path of the host vehicle; and a virtual marker and object modification module configured based on the plurality of parameters and the roadway information, i) to detect one or more roadway markings and objects, ii) to generate modified versions of the one or more detected roadway markings and objects as one or more virtual roadway markings and objects, and iii) via the one or more head-up displays, to overlay the virtual one or more roadway markings and objects over at least a portion of the one or more detected roadway markings and objects in a field of view of an occupant of the host vehicle, wherein the virtual marker and object modification module is configured to via the one or more head-up displays, display chevrons in the field of view, determine at least one of a radius of curvature of an upcoming portion of a road on which the host vehicle is traveling and a speed of the host vehicle, and adjust spacing between the chevrons based on the speed.

9. The virtual augmentation system of claim 1, wherein the virtual marker and object modification module is configured i) to detect an existing center lane line and an existing edge lane line, ii) to generate modified versions of the center lane line and the edge lane line as a virtual center lane line and a virtual edge lane line, and iii) to display the virtual center lane line and the virtual edge lane line over respectively the existing center lane line and existing edge lane line in the field of view.

10. The virtual augmentation system of claim 1, wherein the virtual marker and object modification module is configured i) to detect speed of the host vehicle, ii) based on the speed, to determine at least one of widths of virtual lane lines and a distance between the virtual lane lines, and iii) via the one or more head-up displays, to display the virtual lane lines over existing lane lines in the field of view.

11. A virtual augmentation method comprising:

determine a plurality of parameters indicative of a state of a host vehicle;

obtaining roadway information indicative of roadway markings and objects along a predicted path of the host vehicle;

based on the plurality of parameters and the roadway information, detecting one or more roadway markings and objects, generating modified versions of the one or more detected roadway markings and objects as one or more virtual roadway markings and objects, and via one or more head-up displays, overlaying the virtual one or more roadway markings and objects over at least a portion of the one or more detected roadway markings and objects in a field of view of an occupant of the host vehicle;

changing a detected guardrail to provide a virtual guardrail; and via the one or more head-up displays, displaying the virtual guardrail closer to a lane of travel of the host vehicle in the field of view.

12. The virtual augmentation method of claim 11, further comprising:

collecting global positioning system data, map data and vehicle-to-everything data;

generating perception information including roadway marking and object information regarding the one or more detected roadway markings and objects; and generating the modified versions of the one or more detected roadway markings and objects based on the perception information.

13. The virtual augmentation method of claim 12, further comprising:

determining statuses of the one or more detected roadway markings and objects;

receiving back-office, state, and local requirements for the one or more detected roadway markings and objects; and generating the modified versions of the one or more detected roadway markings based on the statuses of the one or more detected roadway markings and objects and the back-office, state, and local requirements.

14. The virtual augmentation method of claim 13, further comprising:

fusing the perception information, parameters, global positioning system data, map data and vehicle-to-everything data, and back-office, state, and local requirements to generate fused data; and rendering the virtual one or more roadway markings and objects in the field of view based on the fused data.

15. The virtual augmentation method of claim 11, further comprising:

generating a modified version of a detected roadway sign; and via the one or more head-up displays, displaying the modified version of the roadway sign over the detected roadway sign in the field of view.

16. The virtual augmentation method of claim 11, further comprising:

via the one or more head-up displays, displaying chevrons in the field of view;

determining at least one of a radius of curvature of an upcoming portion of a road on which the host vehicle is traveling and a speed of the host vehicle; and based on the at least one of the radius and the speed, adjusting spacing between the chevrons.

17. The virtual augmentation method of claim 11, further comprising:

detecting an existing center lane line and an existing edge lane line;

generating modified versions of the center lane line and the edge lane line as a virtual center lane line and a virtual edge lane line; and displaying the virtual center lane line and the virtual edge lane line over respectively the existing center lane line and existing edge lane line in the field of view.

18. The virtual augmentation method of claim 11, further comprising:

detecting speed of the host vehicle;

based on the speed, determining at least one of widths of virtual lane lines and a distance between the virtual lane lines; and via the one or more head-up displays, displaying the virtual lane lines over existing lane lines in the field of view.

* * * * *